(12) United States Patent
Kadu et al.

(10) Patent No.: US 11,388,408 B2
(45) Date of Patent: Jul. 12, 2022

(54) INTERPOLATION OF RESHAPING FUNCTIONS

(71) Applicant: Dolby Laboratories Licensing Corporation, San Francisco, CA (US)

(72) Inventors: Harshad Kadu, Santa Clara, CA (US); Qing Song, Sunnyvale, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/299,743

(22) PCT Filed: Nov. 27, 2019

(86) PCT No.: PCT/US2019/063796
§ 371 (c)(1),
(2) Date: Jun. 3, 2021

(87) PCT Pub. No.: WO2020/117603
PCT Pub. Date: Jun. 11, 2020

(65) Prior Publication Data
US 2022/0046245 A1 Feb. 10, 2022

Related U.S. Application Data

(60) Provisional application No. 62/774,393, filed on Dec. 3, 2018.

(30) Foreign Application Priority Data

Dec. 3, 2018 (EP) ..................................... 18209740

(51) Int. Cl.
*H04N 19/132* (2014.01)
*H04N 19/182* (2014.01)
(Continued)

(52) U.S. Cl.
CPC ......... *H04N 19/132* (2014.11); *H04N 19/182* (2014.11); *H04N 19/1887* (2014.11); *H04N 19/98* (2014.11)

(58) Field of Classification Search
CPC .. H04N 19/98; H04N 19/1887; H04N 19/182; H04N 19/132
(Continued)

(56) References Cited

U.S. PATENT DOCUMENTS

| 8,811,490 B2 | 8/2014 | Su |
| 10,032,262 B2 | 7/2018 | Kheradmand |
| 2018/0098094 A1 | 4/2018 | Wen |

FOREIGN PATENT DOCUMENTS

WO 2017165494 A2 9/2017

OTHER PUBLICATIONS

ITU-R BT. 2100 "Image Parameter Values for High Dynamic Range Television for Use in Production and International Programme Exchange" ITU, Jul. 2016.
(Continued)

*Primary Examiner* — On S Mung

(57) ABSTRACT

Methods and systems for generating an interpolated reshaping function for the efficient coding of high-dynamic range images are provided. The interpolated reshaping function is constructed based on a set of pre-computed basis reshaping functions. Interpolation schemes are derived for pre-computed basis reshaping functions represented as look-up tables, multi-segment polynomials, or matrices of coefficients in a multivariate, multi-regression representation. Encoders and decoders using asymmetric reshaping and interpolated reshaping functions for mobile applications are also presented.

19 Claims, 4 Drawing Sheets

(51) Int. Cl.
*H04N 19/169* (2014.01)
*H04N 19/98* (2014.01)
(58) Field of Classification Search
USPC .................................................. 375/240.02
See application file for complete search history.

(56) References Cited

OTHER PUBLICATIONS

ITU-R BT.2020-2 "Parameter Values for Ultra-High Definition Television Systems for Production and International Programme Exchange" Oct. 2015.

ITU-R BT.709-6 "Parameter Values for the HDTV Standards for Production and International Programme Exchange" Jun. 2015, pp. 1-19.

Minoo, A. K. et al "Description of the Reshaper Parameters Derivation Process in ETM Reference Software" JCT-VC Meeting, Feb. 2016, San Diego.

Qing, S. et al "Hardware-Efficient Debanding and Visual Enhancement Filter for Inverse Tone Mapped High Dynamic Range Images and Videos" 2016 IEEE International Conference on Image Processing, Sep. 25, 2016, pp. 3299-3303.

SMPTE 2084:2014 "High Dynamic Range Electro-Optical Transfer Function of Mastering Reference Displays" Aug. 16, 2014.

INTERPOLATION OF RESHAPING FUNCTIONS

CROSS-REFERENCE TO RELATED APPLICATIONS

This patent application claims the benefit of priority from U.S. Provisional Patent Application No. 62/774,393, filed on 3 Dec. 2018; European Patent Application No. 18209740.2, filed on 3 Dec. 2018 each one incorporated by reference in its entirety.

TECHNOLOGY

The present invention relates generally to images. More particularly, an embodiment of the present invention relates to generating a new reshaping function for HDR imaging by interpolating existing reshaping functions.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

In a traditional image pipeline, captured images are quantized using a non-linear opto-electronic function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT. 2020, the "PQ" (perceptual quantization) curve described in SMPTE ST 2084, and the "HybridLog-gamma" or "HLG" curve described in and Rec. ITU-R BT. 2100.

As used herein, the term "reshaping" or "remapping" denotes a process of sample-to-sample or codeword-to-codeword mapping of a digital image from its original bit depth and original codewords distribution or representation (e.g., gamma or PQ or HLG, and the like) to an image of the same or different bit depth and a different codewords distribution or representation. Reshaping allows for improved compressibility or improved image quality at a fixed bit rate. For example, without limitation, forward reshaping may be applied to 10-bit or 12-bit PQ-coded HDR video to improve coding efficiency in a 10-bit video coding architecture. In a receiver, after decompressing the received signal (which may or may not be reshaped), the receiver may apply an inverse (or backward) reshaping function to restore the signal to its original codeword distribution and/or to achieve a higher dynamic range.

Reshaping can be static or dynamic. In static reshaping, a single reshaping function is generated and is being used for a single stream or across multiple streams. In dynamic reshaping, the reshaping function may be customized based on the input video stream characteristics, which can change at the stream level, the scene level, or even at the frame level. Dynamic reshaping is preferable; however, certain devices may not have enough computational power to support it. As appreciated by the inventors here, improved techniques for efficient image reshaping when displaying video content, especially HDR content, are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
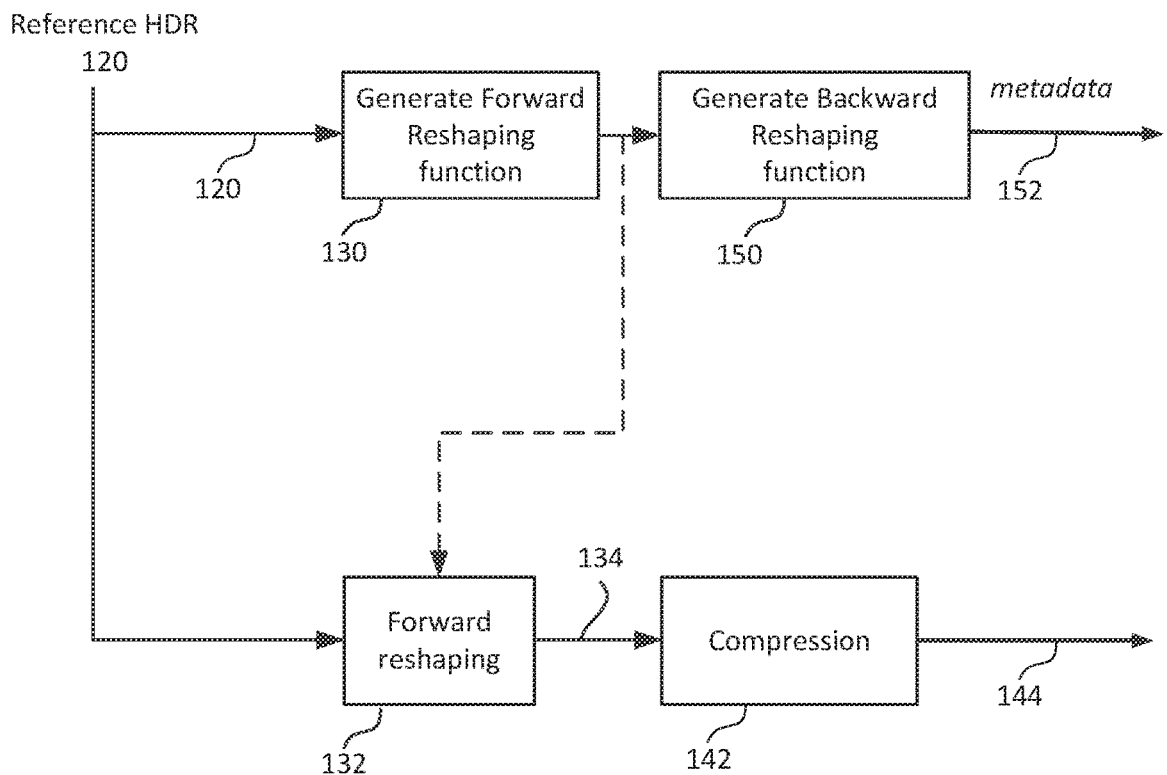
FIG. 1A depicts an example single-layer encoder for HDR data using a reshaping function.

Image reshaping techniques for the efficient coding of images are described herein. Consider a set of L reshaping functions, each one characterized by a reshaping parameter or tag $r(l)$, $l=1, 2, \ldots, L$. Given a new reshaping parameter $r$, where $r(l)<r<r(l+1)$, a new reshaping function may be generated by interpolating reshaping function parameters from the given set. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to image reshaping. In an embodiment, in an apparatus comprising one or more processors, a processor accesses a first set of basis reshaping functions, wherein a basis reshaping function maps pixel codewords from a first codeword representation to a second codeword representation and each reshaping function is characterized by a reshaping-index parameter identifying the reshaping function.

The processor receives an input image in the first codeword representation and a desired reshaping parameter, identifies within the first set of basis reshaping functions a first basis reshaping function with a first reshaping-index parameter lower than the input reshaping parameter and a second basis reshaping function with a second reshaping-index parameter higher than the input reshaping parameter, generates are shaping function by interpolating the first basis reshaping function and the second basis reshaping function using the desired reshaping parameter, applies the reshaping function to the input image to generate a reshaped image in the second codeword representation, and codes the reshaped image to generate a coded reshaped image. The desired reshaping parameter is different from any reshaping-index parameters of the basis reshaping functions of the first set. The basis reshaping functions are basis functions for interpolation. The basis reshaping function may be pre-computed.

The reshaping function is generated by interpolation of the first and second reshaping function by using a desired reshaping parameter which has a value different from any reshaping-index parameters in the first set. The desired reshaping parameter has a value between a value of the first reshaping-index parameter and a value of the second reshaping index parameter. The interpolated reshaping function are identified by, i.e., correspond to, the desired reshaping parameter value, which is not present in the set of reshaping functions. Since interpolation can be performed by using the basis reshaping functions, the reshaping-index parameters and the desired reshaping parameter, the generation of the reshaping function can be simplified. This is advantageous in an apparatus comprising, e.g., a decoder or encoder, with limited computational resources.

In an embodiment, the reshaping-index parameter and the desired reshaping parameter of the respective reshaping functions comprise a device setting of a device for capturing or displaying the input image or the reshaped image.

In an embodiment, the device setting comprises one of: a luminance, a maximum luminance, an exposure time, a picture mode, or a flash mode of the device.

In a decoder, a processor receives a coded reshaped image in a first codeword representation and a desired reshaping parameter, it decodes the coded reshaped image to generate a first decoded image in the first codeword representation, it accesses a set of basis reshaping functions, wherein a reshaping function maps pixel codewords from the first codeword representation to a second codeword representation and each reshaping function is characterized by a reshaping-index parameter identifying the reshaping function. The desired reshaping parameter is different from any reshaping-index parameters of the pre-computed reshaping functions of the first set. The processor identifies within the set of basis reshaping functions a first basis reshaping function with a first reshaping-index parameter lower than the reshaping parameter and a second basis reshaping function with a second reshaping-index parameter higher than the desired reshaping parameter, it generates an output reshaping function based on the first basis reshaping function and the second basis reshaping function, and applies the output reshaping function to the first decoded image to generate an output image in the second codeword representation.

Example HDR Coding System

Figure 1B:
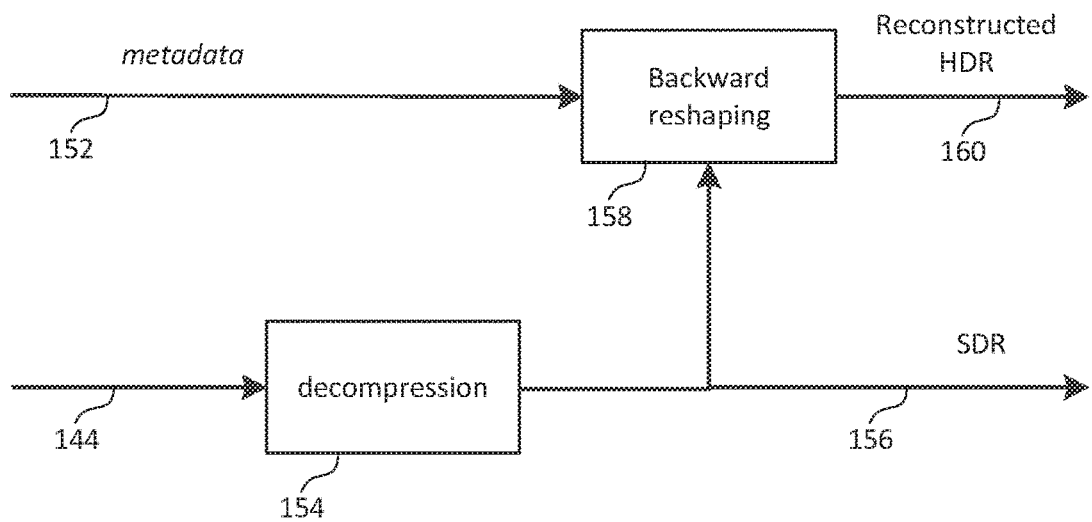
FIG. 1B depicts an example HDR decoder corresponding to the encoder of FIG. 1A.

As described in Ref. [1] and Ref. [2], FIG. 1A and FIG. 1B illustrate an example single-layer backward-compatible codec framework using image reshaping. More specifically, FIG. 1A illustrates an example encoder-side codec architecture, which may be implemented with one or more computing processors in an upstream video encoder. FIG. 1B illustrates an example decoder-side codec architecture, which may also be implemented with one or more computing processors in one or more downstream video decoders.

Under this framework, given reference HDR content (120), corresponding SDR content (134) (also to be referred as base-layer (BL) or reshaped content) is encoded and transmitted in a single layer of a coded video signal (144) by an upstream encoding device that implements the encoder-side codec architecture. The SDR content is received and decoded, in the single layer of the video signal, by a downstream decoding device that implements the decoder-side codec architecture. Backward reshaping metadata (152) is also encoded and transmitted in the video signal with the SDR content so that HDR display devices can reconstruct HDR content based on the SDR content and the backward reshaping metadata.

As illustrated in FIG. 1A, the backward compatible SDR images, such as the SDR images (134), are generated using a forward reshaping mapping (132). Here, "backward-compatible SDR images" may refer to SDR images that are specifically optimized or color graded for SDR displays. A compression block 142 (e.g., an encoder implemented according to any known video coding algorithms, like AVC, HEVC, AV1, and the like) compresses/encodes the SDR images (134) in a single layer 144 of a video signal.

The forward reshaping function in 132 is generated using a forward reshaping function generator 130 based on the reference HDR images (120). Given the forward reshaping function, forward reshaping mapping (132) is applied to the HDR images (120) to generate reshaped SDR base layer 134. In addition, a backward reshaping function generator 150 may generate a backward reshaping function which may be transmitted to a decoder as metadata 152.

Examples of backward reshaping metadata representing/specifying the optimal backward reshaping functions may include, but are not necessarily limited to only, any of: inverse tone mapping function, inverse luma mapping functions, inverse chroma mapping functions, lookup tables (LUTs), polynomials, inverse display management coefficients/parameters, etc. In various embodiments, luma backward reshaping functions and chroma backward reshaping functions may be derived/optimized jointly or separately, may be derived using a variety of techniques as described in the '375 application.

The backward reshaping metadata (152), as generated by the backward reshaping function generator (150) based on the SDR images (134) and the target HDR images (120), may be multiplexed as part of the video signal 144, for example, as supplemental enhancement information (SEI) messaging.

In some embodiments, backward reshaping metadata (152) is carried in the video signal as a part of overall image metadata, which is separately carried in the video signal from the single layer in which the SDR images are encoded in the video signal. For example, the backward reshaping metadata (152) may be encoded in a component stream in the coded bitstream, which component stream may or may not be separate from the single layer (of the coded bitstream) in which the SDR images (134) are encoded.

Thus, the backward reshaping metadata (152) can be generated or pre-generated on the encoder side to take advantage of powerful computing resources and offline encoding flows (including but not limited to content adaptive multiple passes, look ahead operations, inverse luma mapping, inverse chroma mapping, CDF-based histogram approximation and/or transfer, etc.) available on the encoder side.

The encoder-side architecture of FIG. 1A can be used to avoid directly encoding the target HDR images (120) into coded/compressed HDR images in the video signal; instead, the backward reshaping metadata (152) in the video signal can be used to enable downstream decoding devices to backward reshape the SDR images (134) (which are encoded in the video signal) into reconstructed images that are identical to or closely/optimally approximate the reference HDR images (120).

In some embodiments, as illustrated in FIG. 1B, the video signal encoded with the SDR images in the single layer (144) and the backward reshaping metadata (152) as a part of the overall image metadata are received as input on the decoder side of the codec framework. A decompression block 154 decompresses/decodes compressed video data in the single layer (144) of the video signal into the decoded SDR images (156). Decompression 154 typically corresponds to the inverse of compression 142. The decoded SDR images (156) may be the same as the SDR images (134), subject to quantization errors in the compression block (142) and in the decompression block (154), which may have been optimized for SDR display devices. The decoded SDR images (156) may be outputted in an output SDR video signal (e.g., over an HDMI interface, over a video link, etc.) to be rendered on an SDR display device.

In addition, a backward reshaping block 158 extracts the backward reshaping metadata (152) from the input video signal, constructs the optimal backward reshaping functions based on the backward reshaping metadata (152), and performs backward reshaping operations on the decoded SDR images (156) based on the optimal backward reshaping functions to generate the backward reshaped images (160) (or reconstructed HDR images). In some embodiments, the backward reshaped images represent production-quality or near-production-quality HDR images that are identical to or closely/optimally approximating the reference HDR images (120). The backward reshaped images (160) may be outputted in an output HDR video signal (e.g., over an HDMI interface, over a video link, etc.) to be rendered on an HDR display device.

In some embodiments, display management operations specific to the HDR display device may be performed on the backward reshaped images (160) as a part of HDR image rendering operations that render the backward reshaped images (160) on the HDR display device.

Example System for Adaptive Reshaping

Nomenclature

Without loss of generality, let v denote a parameter or variable (e.g., an image, a pixel value, or other domain characteristic) in the HDR domain, let s denote parameters or values in the reshaped (e.g., SDR) domain, and let r denote parameters or values in the reconstructed HDR domain. Those symbols may also be used as superscript or subscript. For example, the maximum brightness may be denoted in the original HDR domain as $I_{max}^v$, in the reshaped domain (e.g., SDR) as $I_{max}^v$, and in the reconstructed as $I_{max}^v$. Similar notation may be used for other attributes defining a domain, such as: color space, color gamut, the EOTF being used, and the like.

Consider a database containing reference (or "master") HDR and SDR pairs, that is, for each HDR image there is a corresponding SDR image, then $v_{t,i}^{ch}$ will denote the un-normalized value of pixel i of channel ch in frame t of HDR reference image, where channel represents a color component, such a luma (Y) or chroma (e.g., Cb or Cr in a YCbCr representation), thus ch={Y,C_0,C_1}. As used herein, the term unnormalized pixel value denotes a value in $[0, 2^B-1]$, where B denotes the bit depth of the pixel values (e.g., B=8, 10, or 12 bits). As used herein, the term normalized pixel value denotes a pixel value in [0, 1).

Similarly, $s_{t,i}^{ch}$ denotes the un-normalized value of the corresponding pixel in the SDR reference image, $\hat{s}_{t,i}^{ch}$ denotes the un-normalized value of the corresponding pixel in the SDR reshaped image, and $r_{t,i}^{ch}$ denotes the un-normalized value of pixel i of channel ch in frame t of the HDR reconstructed image. Let the bit depth of the HDR image be $b_v$, and let the bit depth of the SDR image be $b_s$.

Denote a forward reshaping (FR) function as a mapping function of HDR values (v) to reshaped values (ŝ)

$$(\hat{s}_{t,i}^{Y}, \hat{s}_{t,i}^{C_0}, \hat{s}_{t,i}^{C_1}) = FR_t^{(v \to s)}(v_{t,i}^{Y}, v_{t,i}^{C_0}, v_{t,i}^{C_1}). \quad (1)$$

The goal of the FR function is to minimize the difference between $s_{t,i}^{ch}$ and $\hat{s}_{t,i}^{ch}$ pixel values. Denote the backward reshaping (BR) function as a mapping function of reshaped values (ŝ) to reconstructed values (r)

$$(r_{t,i}^{Y}, r_{t,i}^{C_0}, r_{t,i}^{C_1}) = BR_t^{(s \to r)}(\hat{s}_{t,i}^{Y}, \hat{s}_{t,i}^{C_0}, \hat{s}_{t,i}^{C_1}). \quad (2)$$

The goal of the BR function is to minimize the difference between $v_{t,i}^{ch}$ and $r_{t,i}^{ch}$ pixel values if both signals are in the same domain. If they are in different domains, such as different nits, then the optimization objective may change.

As described in Ref. [3], in some embodiments, a luma reshaping function may be described in terms of piece-wise, linear or non-linear (e.g., second order), polynomials. Alternatively, it may be described as a 1D look-up table, e.g.:

$$r_{t,i}^{Y} = BR_t^{(s \to r), Y}(\hat{s}_{t,i}^{Y}). \quad (3)$$

For chroma, a chroma reshaping function may be described in terms of a multivariate multi-regression (MMR) polynomials and its coefficients (Ref. [2], Ref. [4]), or as:

$$r_{t,i}^{C0} = BR_t^{(s \to r),C0}(\hat{s}_{t,i}^Y, \hat{s}_{t,i}^{C0}, \hat{s}_{t,i}^{C1}) = \hat{S} M^{C0},$$

$$r_{t,i}^{C1} = BR_t^{(s \to r),C1}(\hat{s}_{t,i}^Y, \hat{s}_{t,i}^{C0}, \hat{s}_{t,i}^{C1}) = \hat{S} M^{C1}, \quad (4)$$

where $\hat{S}$ denotes a data matrix of reshaped luma and chroma samples and M denotes the matrix with the MMR coefficients (for either the $C_0$ or $C_1$ or chroma components). A simplified review of the MMR model is also provided later on, in equations (28)-(32).

For static forward and backward reshaping, all $FR_t$ and $BR_t$ functions along the time domain (e.g., t=0, 1, . . . , N) contain the same coefficients. In an embodiment, the polynomial parameters and coefficients for FR and BR may be communicated to a downstream decoder using metadata (e.g., 152).

Semi-Adaptive Reshaping

Under fully-adaptive reshaping, given a pair of HDR and SDR images representing the same scene, one may design optimum forward and backward reshaping functions so that the reconstructed HDR image after inverse reshaping is as close as possible to the original HDR image. While, fully-adaptive reshaping is preferred, in many applications (e.g., mobile phones, hand-held cameras, and the like) it is impractical due to lack of computational resources. In certain applications it may be more practical to maintain a set of pre-computed reshaping functions (to be referred as the "basis reshaping functions,") each one corresponding to specific device settings (e.g., flash mode, exposure time, picture mode, and the like), denoted as $r^{(l)}$. The reshaping index parameter $r^{(l)}$ may be called also an "identification tag" of the corresponding pre-computed reshaping function. This identification tag may be a device setting, like a maximum luminance, e.g. 100 nits, 200 nits etc., an exposure time, e.g. 5 ms, 10 ms, 1000 ms, etc., an ISO number, e.g. 100, 200, 400, etc. For different device settings it is possible to precompute different reshaping functions (e.g. being corresponding curves). For example, to generate a function for a desired ISO number of 150, an interpolation between a pre-computed reshaping function with ISO number 100 and a pre-computed reshaping function with ISO number 200, can be performed. In another non-limiting example, let us assume that we have 5 pre-computed reshaping functions. The first pre-computed reshaping function is for maximum luminance of 100 nits, the second one is for 200 nits, the third one is for 500 nits, the fourth one is for 1000 nits and the fifth one is for maximum luminance of 4000 nits. These numbers, 100 nits, 200 nits, 500 nits, 1000 nits and 4000 nits are the "identification tags" for those pre-computed reshaping functions. In this case, the "identification tag" is maximum luminance. In another example, the identification tag may be an exposure time as well.

In other words, each pre-computed reshaping function has a different identification tag. These identification tags can be device settings e.g. maximum luminance, exposure time, ISO number, picture mode, etc. However, the identification tags are not limited to be any of the device settings listed above but can be any other device setting.

Figure 2:
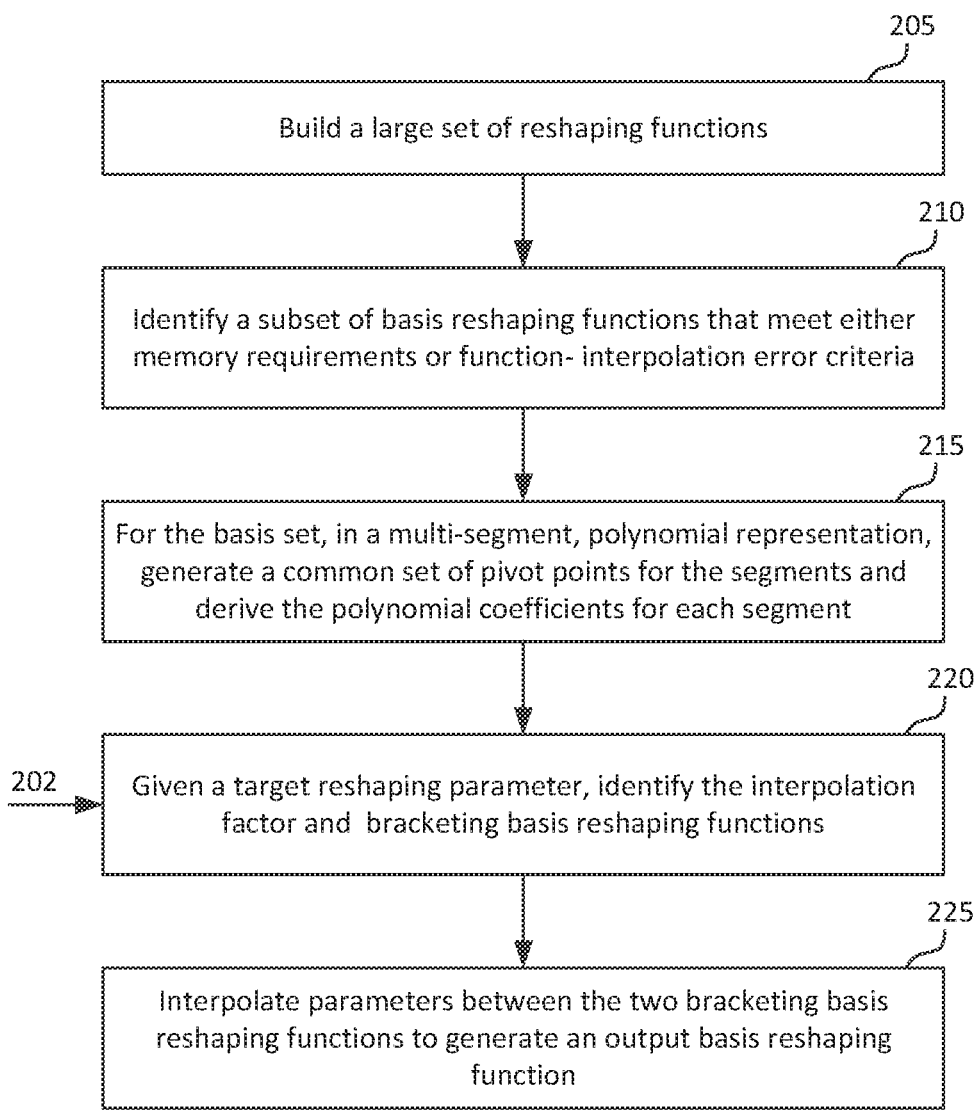
FIG. 2 depicts an example process for building a set of basis reshaping functions and applying reshaping function interpolation according to an embodiment of this invention.

However, the number of such static reshaping functions may be limited due to memory restrictions. Thus, in an embodiment, a semi-adaptive reshaping method is proposed, where given a setting r not in the set (e.g., $r^{(l)} < r < r^{(l+1)}$), a new reshaping function is generated by interpolating parameters among the set of pre-stored reshaping functions. Thus, as depicted in FIG. 2, as an example, a semi-adaptive reshaping process may include the following steps:

Step 205. Build a large set of reshaping functions taking into considerations as many system parameters as possible.

Step 210. Select a representative subset of reshaping functions (e.g., the basis set) among the large set to save memory requirements. Since interpolation may yield errors, in some embodiments, the basis functions may be selected so that the largest possible interpolation error is minimized.

Step 215. In some embodiments, each of the basis reshaping functions may be approximated using a piece-wise polynomial representation characterized by: the number of polynomial segments, pivot points for each segment (e.g., its starting and ending codewords), and the parameters for the polynomial in each segment. It will be shown that if all basis functions are characterized by the same set of pivots, then reshaping function interpolation may be done using simple interpolation of the corresponding polynomial coefficients in each segment. In this step, a common set of pivot points for all basis functions is selected according to a variety of optimization criteria.

Step 220. Given input reshaping parameters (202) (e.g., the maximum luminance of a target display), and given the set of basis functions from step 215, a device may identify bracketing "low" (e.g., one for $r^{(l)}$) and "high" (e.g., one for $r^{(l+1)}$) support basis functions based on which it will generate the interpolated reshaping function. Using linear interpolation, a single interpolation factor (0<α≤1) may be derived.

Step 225. Given α, and the two basis functions used for function interpolation, this step generate the interpolated reshaping function and the appropriate metadata to communicate the reshaping function to a decoder.

The above methodology may be applied to generate both interpolated forward and backward reshaping functions. Each of these steps will be described next in further detail.

Construction of a Large Set of Reshaping Functions

Ideally, there should be no need to perform any interpolation among reshaping functions. Given unlimited storage, for $L^0$ sets (or databases) of reference images (e.g., each one at a particular setting of maximum luminance, camera setting, and the like), Table 1 describes in pseudocode the creation of a reshaping function for a set of images. The key steps include: a) the collection of statistics (histograms) for the images in the database, b) the generation of a cumulative density function (CDF) for the set, c) using CDF matching (Ref. [3]) to generate a reshaping function and d) smoothing the reshaping function. While, for better clarity, Table 1 may refer to images in each pair as SDR and HDR images, the same methodology can be applied when generating reshaping functions using any type of different signal representation formats. For example, within an image database, in each pair, the images may differ in the EOTF function (e.g., gamma versus PQ), bit-depth (e.g., 8-bit vs 10-bit), color gamut, color format (e.g., 4:4:4 vs 4:2:0), color space, and the like.

As described in Table 1, each dynamic range is subdivided into bins. Denote the number of bins in the SDR signal and the HDR signal as $M^S$ and $M^V$, respectively (e.g., $M^S$=1024), with corresponding intervals as $w_{bS}$ and $w_{bV}$. Note that $M^S$ can be equal to $N^S$, and $M^V=N^V$, which yields the highest precision. For example, given a normalized range of SDR codewords in [0, 1), $M^S * w_{bS}=1$.

TABLE 1

Generation of forward reshaping function in a database

```
For the l-th database, l = 0, 1, 2, . . . , L⁰
// Histogram initialization
// F denotes the number of SDR/HDR image pairs in the database
// F can vary in each database
// P denotes the number of pixels in an image
// Generate image histograms in the database
h_{j,b}^{s,(l)} = 0, for b = 0, . . . , M^S - 1
h_{j,b}^{v,(l)} = 0, for b = 0, . . . , M^V - 1
// Scan for each pixel in a database to build SDR and HDR prob.
density functions (PDF)
for( j = 0; j < F; j + + ){
  for ( i = 0; i < P ; i ++ ){
```

$$b^S = \left\lfloor \frac{s_{ji}^{y,(l)}}{w_{bS}} \right\rfloor$$

$$b^V = \left\lfloor \frac{s_{ji}^{y,(l)}}{w_{bV}} \right\rfloor$$

```
    h_{j,b^S}^{s,(l)} ++;      // histogram from 1st dynamic range (e.g., SDR)
    h_{j,b^V}^{v,(l)} ++;      // histogram from 2nd dynamic range (e.g., HDR)
  }
}
//Generate Reshaping Function
// STEP 1: initialization of cumulative histograms
h_b^{s,(l)} = 0. for b = 0, . . . , M^S - 1
h_b^{v,(l)} = 0, for b = 0, . . . , M^V - 1
c_b^{s,(l)} = 0, for b = -1, . . . , M^S - 1
c_b^{v,(l)} = 0, for b = -1, . . . , M^V - 1
// STEP 2: scan for each pixel in the first database to build cumulative
PDF
for( j = 0; j < F; j ++ ){
  for (b = 0 ; b < M^S ; b ++ ){
    h_b^{s,(l)} = h_b^{s,(l)} = h_{jb}^{s,(l)} ;   // histogram in SDR
  }
  for (b = 0 ; b < M^V ; b ++ ){
    h_b^{v,(l)} = h_b^{v,(l)} = h_{jb}^{v,(l)} ;   // histogram in HDR
  }
}
// STEP 3: build CDF (Cumulative density function, integral of PDF)
for( b = 0 : b < M^S ; b ++ )}
  c_b^{s,(l)} = c_{b-1}^{s,(l)} + h_b^{s,(l)}
}
for( b = 0 : b < M^V ; b ++ ){
  c_b^{v,(l)} = c_{b-1}^{v,(l)} + h_b^{v,(l)}
}
// STEP 4: normalize CDF between [0 1]
for( b = 0 ; b < M^S; b ++ ){
```

$$c_b^{s,(l)} = \frac{c_b^{s,(l)}}{P}$$

```
}
for( b = 0 ; b < M^V; b ++ ){
```

$$c_b^{v,(l)} = \frac{c_b^{v,(l)}}{P}$$

```
}
// STEP 5: generate reshaping function using CDF Mapping
for( b = 0 ; b < M^S; b ++ ){
  // for each sample point in the first domain (e,g., SDR), find the
  corresponding CDF value. For that CDF value find the value of the
  signal in the second domain (e.g., HDR).
    find k such that c_{k-1}^{v,(l)} ≤ c_b^{s,(l)} ≤ c_k^{v,(l)}
  // find the 2nd domain sample points
    perform interpolation based on c_{k-1}^{v,(l)} and c_k^{v,(l)}
```

$$\tilde{T}_b^{(l)} = (k-1) + \frac{c_b^{s,(l)} - c_{k-1}^{v,(l)}}{c_k^{v,(l)} - c_{k-1}^{v,(l)}}$$

```
}
// STEP 6: curve clipping
// search flat areas at dark area
for( b= 1; b < M^S; b++){
  if( |T̃_b^{(l)} - T̃_{b-1}^{(l)}| > Δ ){   // (e.g., Δ =0)
    s^L=clip3( b-2, 0, M^S-1);
    break;
  }
}
// search flat areas at bright area
for( b= N^S -1; b < 0; b--){
  if( |T̃_b^{(l)} - T̃_{b-1}^{(l)}| > Δ ){
    s^H=clip3( b+1, 0, M^S-1);
    break;
  }
}
// STEP 7: curve smoothing using varying window size
//        ( can be speed up by using cumulative sum)
// lower end
for( b= 0; b ≤ s^L ; b++){
  T_b^{(l)} = T̃_b^{(l)}
}
// higher end
for( b= s^H ; b < M^S -1; b++){
  T_b^{(l)} = T̃_b^{(l)}
}
// mid-tone smoothing
for ( b = s^L + 1 ; b < s^H ; b++){
```

$$W_b = \min\left\{b - s^L + 2, s^H - b + 2, \frac{W}{2}\right\} // (e.g., W = 8 \text{ for 8-bit data,}$$

32 for 10-bit data)
$W_b^- = \text{clip3}(b - W_b, 0, M^S - 1)$
$W_b^+ = \text{clip 3}(b + W_b, 0, M^S - 1)$ $$T_b^{(l)} = \frac{1}{W_b^+ - W_b^- + 1} \sum_{k=W_b^-}^{W_b^+} \tilde{T}_b^{(l)}$$

```
}
// STEP 8: rounding and clipping
T_b^{(l)} = clip3(round(T_b^{(l)}),0, N^V - 1);
```

The above process can be performed for all databases to generate a set of backward reshaping functions $\{T_b^{(l)}\}$.

In Table 1, the function y=clip3(x, Min, Max) is defined as:

$$y = \begin{cases} \text{Min} & \text{if } x \leq \text{Min} \\ \text{Max} & \text{if } x \geq \text{Max} \\ x & \text{otherwise} \end{cases} \quad (5)$$

In Table 1, the CDF-matching step (STEP 5) can be simply explained as follows. Consider that an SDR codeword $x_s$ corresponds to a specific CDF value c in the CDF $c^{s,(l)}$ and that an HDR codeword $x_v$ also corresponds to the same specific CDF value c in the CDF $c^{v,(l)}$, it is then determined that SDR value $s=x_s$ should be mapped to HDR value $x_v$. Alternatively, in STEP 5, for each SDR value ($x_s$), one computes the corresponding SDR CDF value (say, c), and then tries to identify via simple linear interpolation from existing HDR CDF values the HDR value ($x_v$) for which $c^{v,(l)}=c$.

STEP 5 can also be easily modified to generate a forward reshaping function instead. In such a scenario, for each HDR value ($x_v$), one computes the corresponding HDR CDF value (say, c), and then tries to identify via simple linear interpolation from existing SDR CDF values the SDR value ($x_s$) for which $c^{s,(l)}=c$, thus mapping $x_v$ values to $x_s$ values.

Generating a Representative Set of Basis Reshaping Functions

Denote as $$\overline{BR}_t^{(s \to r^{(s)})}(), \text{ for } 0 \leq l \leq L^0-1,$$

the set of original $L^0$ (backward) reshaping functions generated at a fine $r^{(l)}$ interval. In an embodiment, it may be desired to select out of this set a smaller set of L ($L<L^0$) representative basis reshaping functions so that one can generate the rest using a function interpolation method. Assuming the reshaping functions are ordered in a monotonically increasing manner with index l, to avoid the need for extrapolation, the first and the last functions should be part of the basis functions. Thus:

$$BR_t^{(s \to r^{(0)})}() = \overline{BR}_t^{(s \to r^{(0)})}(),$$

$$BR_t^{(s \to r^{(L-1)})}() = \overline{BR}_t^{(s \to r^{(L^0-1)})}(), \quad (6)$$

where BR denotes a basis function selected among the original $\overline{BR}$ functions. Note: for notation purposes, in the remaining of this description, given a set of $L^0$ $\overline{BR}$ functions, a set of L BR functions is selected. Given those basis BR functions, interpolated $\overline{BR}$ functions are generated.

Two different scenarios are considered according to whether L is given (based on known memory requirements) or the value of L can be adjusted to meet a certain quality criterion. As an example, Table 2 describes in pseudo-code the case where L and the L basis functions are derived to meet a minimum interpolation threshold $\Delta$.

TABLE 2

Basis reshaping function selection using an interpolation threshold criterion

Set max acceptable interpolation error $\Delta$ // (e.g., $\Delta = 1/2^{12}$)
$\Omega = \{0\}$
$l^s = 0$
for($l^e = 2$; $l^e < L^0$; $l^e$ ++){
  for($l^i = l^s + 1$; $l < l^e$; l++){
  // interpolate all reshaping function between $l^s$ and $l^e$
using ls and $l^e$ function.
    Compute $\alpha$ //interpolation factor $$\overline{\overline{BR}}_t^{s \to r^{(l)}}() = \alpha \cdot BR^{(s \to r^{(l^s)})}() + (1 - \alpha) \cdot BR^{(s \to r^{(l^e)})}()$$

Compute interpolation error $$\overline{error}_t^{(s \to r^{(l)})} = \left\| \overline{\overline{BR}}_t^{s \to r^{(l)}}() - BR^{(s \to r^{(l)})}() \right\|$$

If $\overline{error}_t^{(s \to r^{(l)})} > \Delta$){

$\Omega = \Omega \cup \{l^e - 1\}$
      $l^s = l^e - 1$
      break;
    }
  }
}
$\Omega = \Omega \cup \{l^0 - 1\}$ In an embodiment, computing the interpolation factor $\alpha$ may comprise identifying the distance from the desired reshaping parameter (r) to the indices or tags of the bracketing basis functions. For example, in an embodiment, if reshaping functions are derived based on a parameter $r^{(l)}$ for $l=1, 2, \ldots, L$, and the desired value is $r^{(l)} < r \leq r^{(l+1)}$ then $$\alpha = \frac{r^{(l+1)} - r}{r^{(l+1)} - r^{(l)}}. \quad (7)$$

In an embodiment, one may consider the interpolation error for just luma, or for both luma and chroma. For luma, the error may be computed as:

$$\overline{error}_t^{(s \to r^{(l)})} = \sum_b \left\| \overline{T}_b^{(s \to r^{(l)})} - T_b^{(s \to r^{(l)})} \right\|, \quad (8)$$

where $\overline{T}_b$ denotes the interpolated reshaping function and $T_b$ denotes a selected basis function.

For chroma, assuming again an MMR reshaping model, given the sample points $\overline{S}_t$, backward reshaping may be expressed as $$\overline{v}_t^{(s \to r^{(l)})} = \overline{S}_t \overline{M}_t,$$

$$\overline{v}_t^{(s \to r^{(l)})} = \overline{S}_t \overline{M}_t, \quad (9)$$

where $\overline{M}_t$ denotes a set of MMR coefficients computed based on the original reshaping functions and $\overline{M}_t$ denotes the set of interpolated MMR coefficients. Equations (28)-(37) later in this specification provide additional details on the derivation of MMR coefficients for the chroma. Given equation (9), the chroma interpolation error is given by $$\overline{error}_t^{(s \to r^{(l)})} = \left\| \overline{v}_t^{(s \to r^{(l)})} - \overline{v}_t^{(s \to r^{(l)})} \right\|. \quad (10)$$

If the value of L is fixed, then one can repeat the above procedure by adjusting the threshold $\Delta$ to achieve the target number of basis functions. For example, as shown in Table 3, a bi-section search can be conducted to find the best subset.

TABLE 3

Basis reshaping function selection using a fixed number of basis functions

Initalize $\Delta$
M = L //L: Target number of basis functions
converge_flag = 0;
while( converge_flag == 0 ){$\Delta$
  Search the set of basis functions with using algorithm in Table 2
  Find the number of basis functions $|\Omega|$
  if( $|\Omega| > M$ )
    increase $\Delta$
  elseif( $|\Omega| < M$ )
    decrease $\Delta$
  else
    converge_flag = 1;
}
Generating a common set of pivot points for the basis reshaping functions As described earlier, each of the reshaping functions may be represented using a piece-wise polynomial. Each such piece-wise polynomial is represented by pivot points representing the start- and end-point of each polynomial segment and the polynomial coefficients for each segment. In an embodiment, such functions can be interpolated only if their segments are aligned and all have the same set of pivot points. There are multiple ways to generate a common set of pivot points and some of these techniques are discussed in this section.

In an embodiment, the optimization function can be formulated as a problem to minimize the overall fitting errors for all L LUTs and all codewords. Let $s_b^Y$ denote the normalized input value between 0 and 1. For K segments, denote the pivot points as $\{\lambda_m\}$, for m=0, 1, . . . , K (e.g., K=8). For example, $[\lambda_m, \lambda_{m+1})$, denotes the m-th polynomial segment. Then, given the $\{\lambda_m\}$ values, one may compute the polynomial coefficients $\{\alpha_{ml}^{(l)}\}$, e.g., for second-order polynomials, for k=0, 1, and 2, to solve for $$J_1 = \min \sum_{l=0}^{L-1} \sum_{b=\lambda_m}^{\lambda_{m+1}-1} \left|BR^{(s \to r^{(l)}), Y}(s_b^Y) - T_b^{(l)}\right|^2 \quad (11)$$

$$= \min_{\{a_{mk}^{(l)}\}} \sum_{l=0}^{L-1} \sum_{b=\lambda_m}^{\lambda_{m+1}-1} \left|\sum_{k=0}^{2} a_{mk}^{(l)} \cdot (s_b^Y)^k - T_b^{(l)}\right|^2.$$

In another embodiment, the optimization problem may be formulated as minimizing the maximal predicted error between the predicted value and the reference value ($T_b^{(l)}$):

$$J_2 = \underset{\{a_{mk}^{(l)}\}}{\mathrm{minmax}} \left|\sum_{k=0}^{2} a_{mk}^{(l)} \cdot (s_b^Y)^k - T_b^{(l)}\right|, \quad (12)$$

for $\lambda_m \leq b \leq \lambda_{m+1} - 1$ and $0 \leq l \leq L-1$.

When using a piece-wise approximation, it is desired that pivot points do not introduce discontinuities which bring "sudden jumps" since those jumps yield contouring artifacts. Then, the optimization problem can be formulated as minimizing the maximal predicted error between nearby predicted values $$J_3 = \underset{\{a_{mk}^{(l)}\}}{\mathrm{minmax}} \left|\sum_{k=0}^{2} a_{mk}^{(l)} \cdot (s_b^Y)^k - \sum_{k=0}^{2} a_{mk}^{(l)} \cdot (s_{b-1}^Y)^k\right|, \quad (13)$$

for $\lambda_m + 1 \leq b \leq \lambda_{m+1} - 1$ and $0 \leq l \leq L - 1$.

Note that the above problem formulation has a trivial solution where the prediction coefficients are all zeros. Thus, in an embodiment, a joint-optimization problem may be defined as: solve for $J_3$ given a non-trivial solution for $\{\alpha_{mk}^{(l)}\}$ values given by either $J_1$ or $J_2$.

In an embodiment, one may also apply an overlapped constraint to smooth the transition around the pivot points. Given an overlap window $W_m$ (e.g., $W_m$=50), the optimization problem now may be described as: for $$J_1 = \min_{\{a_{mk}^{(l)}\}} \sum_{l=0}^{L-1} \sum_{b} \left|\sum_{k=0}^{2} a_{mk}^{(l)} \cdot (s_b^Y)^k - T_b^{(l)}\right|^2, \text{ or} \quad (1)$$

$$J_2 = \underset{\{a_{mk}^{(l)}\}}{\mathrm{minmax}} \left|\sum_{k=0}^{2} a_{mk}^{(l)} \cdot (s_b^Y)^k - T_b^{(l)}\right|,$$

for $\max\{\lambda_m - W_m, 0\} \leq b \leq \min\{\lambda_{m+1} + W_m - 1, M^s - 1\}$ and $0 \leq l \leq L - 1$.

Note that the pivot point points may be bounded by the standard specifications (e.g., SMPTE 274M) for lower bound, $\lambda_m^s$, and upper bound, $\lambda_m^e$, of "legal" or "broadcast safe" signal values; since values below $\lambda_m^s$ and above $\lambda_m^e$ will be clipped. For example, for 8-bit signals, the broadcast-safe area is [16, 235] instead of [0, 255].

Denote the extended pivot points as $$\lambda_m^L = \max\{\lambda_m - W_m, \lambda_m^s\},$$

$$\lambda_m^R = \min\{\lambda_{m+1} - W_m - 1, \lambda_m^e\}. \quad (15)$$

Given a window size $W_m$ and pivot point $\lambda_m$ for m-th segment for the l-th function, the solution to minimize the prediction error is $$J_m^{(l)} = \min_{\{a_{mk}^{(l)}\}} \sum_{b=\lambda_m^L}^{\lambda_m^R - 1} \left|\sum_{k=0}^{2} a_{mk}^{(l)} \cdot (s_b^Y)^k - T_b^{(l)}\right|^2. \quad (16)$$

In matrix form, $$S_m = \begin{bmatrix} 1 & s_{\lambda_m^L}^Y & (s_{\lambda_m^L}^Y)^2 \\ 1 & s_{\lambda_m^L+1}^Y & (s_{\lambda_m^L+1}^Y)^2 \\ \vdots & \vdots & \vdots \\ 1 & s_{\lambda_m^R-1}^Y & (s_{\lambda_m^R-1}^Y)^2 \\ 1 & s_{\lambda_m^R}^Y & (s_{\lambda_m^R}^Y)^2 \end{bmatrix}, \quad (17)$$

$$t_m^{(l)} = \begin{bmatrix} T_{\lambda_m^L}^{(l)} \\ T_{\lambda_m^L+1}^{(l)} \\ \vdots \\ T_{\lambda_m^R-1}^{(l)} \\ T_{\lambda_m^R}^{(l)} \end{bmatrix},$$

$$a_m^{(l)} = \begin{bmatrix} a_{m0}^{(l)} \\ a_{m1}^{(l)} \\ a_{m2}^{(l)} \end{bmatrix}.$$

Then, equation (16) may be expressed in matrix form as $$J_m^{(l)} = \min_{a_m^{(l)}} \|t_m^{(l)} - S_m a_m^{(l)}\|^2, \quad (18)$$

and its least square solution is given by $$a_m^{(l), opt} = (S_m^T S_m)^{-1} (S_m^T t_m^{(l)}). \quad (19)$$

In summary the overall problem is to solve $\{a_m^{(l)}\}$ or all m and for all l $\{\lambda_m\}$ for all m using a set of $\{W_m\}$ windowing parameters, under a combination of optimization criteria. Finding a solution for $J_3$ is not simple, as it builds on top of $J_1$ or $J_2$ and the search range for the considered problem is too large. In an embodiment, for example, as depicted in Table 4, one may apply a Monte Carlo simulation by randomizing the pivot points and overlapping windows for U iterations.

TABLE 4

Generation of common of pivot points using a Monte Carlo method

```
Initialize { a_m^(l),opt } and { λ_m^opt }
J_3^opt = inf
for( u = 0; u < U; u ++ ){   // for each iteration
    // STEP 1: set pivot points
    valid_pivot_flag = 0;
    while(valid_pivot_flag == 0 ){
        Randomize { λ_m } within range [ λ_m^s, λ_m^e ] for all m
        Randomize { W_m} for all m
        Obtain λ_m^L = max{λ_m −W_m, λ_m^s } and λ_m^R = min
            {λ_{m+1} + W_m −1, λ_m^e }
        if ( λ_m < λ_{m+1} for all m ){
            valid_pivot_flag = 1
        }
    }
    // STEP 2: compute the polynomial coefficients for each piece
    in each basis for( m =0 ; m < M; m++ ) {   // piece
        compute S_m
        for( l = 0; l < L; l++ ) {   // basis
            obtain response vector t_m^(l)
            compute least squared solution a_m^(l) = (S_m^T S_m)^{-1}(S_m^T t_m^(l))
            compute predicted value
```

$$\hat{T}_b^{(l)} = \sum_{k=0}^{2} a_{mk}^{(l)} \cdot (s_b^Y)^k \text{ for } b \in [\lambda_m, \lambda_{m+1} - 1]$$

```
        }
    }
    // STEP 3: compute the objective function
    J_3^u = max {|T̂_b^(l) − T̂_{b−1}^(l)||b ∈ [0, M^s − 1],l ∈ [0, L − 1]}
    // update the optimal solution
    If( J_3^u < J_3^opt ){
        J_3^opt = J_3^u
        { a_m^(l),opt } = { a_m^(l) }
        { λ_m^opt } = { λ_m }
    }
}
```

Interpolation of Reshaping Functions

Examples of interpolating reshaping functions will now be shown for backward reshaping functions; however, similar techniques may be applied to forward reshaping functions as well.

Given a set of L pre-computed backward reshaping functions (the "basis" functions) for a set of different parameters $\{r^{(0)}, R^{(1)}, \ldots r^{(L-1)}\}$ (e.g., maximum luminance), the corresponding basis functions may be expressed as $$r_{t,i}^{(l),Y} = BR_t^{(s \to r^{(l)}),Y}(s_{t,i}^Y),$$

$$r_{t,i}^{(l),C0} = BR_t^{(s \to r^{(l)}),C0}(\hat{s}_{t,i}^Y, \hat{s}_{t,i}^{C0}, \hat{s}_{t,i}^{C1}),$$

$$r_{t,i}^{(l),C1} = BR_t^{(s \to r^{(l)}),C1}(\hat{s}_{t,i}^Y, \hat{s}_{t,i}^{C1}, \hat{s}_{t,i}^{C1}), \quad (20)$$

Consider now the requirement to generate a new reshaping function with parameter r, where $r^{(l)} \le r < r^{(l+1)}$, then one may generate the new function using the following function interpolation scheme. First, given that the new reconstructed HDR samples can be interpolated from samples of the two near-by (bracketing) functions l and l+1, let $$\alpha = \frac{r^{(l+1)} - r}{r^{(l+1)} - r^{(l)}}, \quad (21)$$

denote a linear interpolation factor. Then $$r_{t,i}^Y = \alpha \cdot r_{t,i}^{(l),Y} + (1-\alpha) \cdot r_{t,i}^{(l+1),Y},$$

$$r_{t,i}^{C0} = \alpha \cdot r_{t,i}^{(l),C0} + (1-\alpha) \cdot r_{t,i}^{(l+1),C0},$$

$$r_{t,i}^{C1} = \alpha \cdot r_{t,i}^{(l),C1} + (1-\alpha) \cdot r_{t,i}^{(l+1),C1}. \quad (22)$$

Given that luma and chroma reshaping may be performed using different schemes, luma and chroma interpolation are discussed separately. For luma, the luma reshaping function may be represented as a look-up table (LUT) format or as a multi-segment, piece-wise, polynomial. If it is in a LUT format, then, using linear interpolation yields $$r_{t,i}^Y = \alpha \cdot BR_t^{(s \to r^{(l)}),Y}(s_{t,i}^Y) + (1-\alpha) \cdot BR_t^{(s \to r^{(l+1)}),Y}(s_{t,i}^Y). \quad (23)$$

The function form can be expressed as $$BR_t^{(s \to r),Y}(\ ) = \alpha \cdot BR_t^{(s \to r^{(l)}),Y}(\ ) + (1-\alpha) \cdot BR_t^{(s \to r^{(l+1)}),Y}(\ ). \quad (24)$$

Interpolated reshaping functions (22), (23) and (24) are intermediate functions between the two basis reshaping functions used for interpolation. For example, for equation (24), interpolated reshaping function $BR_t^{(s \to r),Y}(\ )$ will be a function 'located between' basis reshaping function $BR_t^{(s \to r^{(l)}),Y}(\ )$ and basis reshaping function $BR_t^{(s \to r^{(l+1)}),Y}(\ )$ e.g. with no common values shared between them. In other words, the basis reshaping functions may be uniquely identified by the respective reshaping-index parameter and as such being functions of the same type but providing different mapped values (mapped pixel codewords). The interpolated reshaping function may be uniquely associated to a desired basis reshaping parameter having a value between the reshaping-index parameters of the two basis reshaping functions used for interpolation. Therefore, the interpolated reshaping function may provide mapped pixel codewords (in the second codewords representation) in function of the input pixel codewords (in the first codewords representation) which are still different from mapped pixel codewords provided by the two basis reshaping functions used for interpolation.

Assuming the pivot points of all reshaping polynomials are the same, then the parameters of the interpolated reshaping function in equation (24) can be derived by simple interpolation of the corresponding segment coefficients in the two basis functions. For example, assuming each segment is represented by a second-order polynomial, when the input SDR value is within the m-th segment (m=1, 2, K, where K is the total number of segments), the predicted values can be expressed as a second-order polynomial:

$$BR_t^{(s \to r^{(l)}),Y}(s_{t,i}^Y) = \sum_{k=0}^{2} a_{mk}^{(l)} \cdot (s_{t,i}^Y)^k, \quad (25)$$

$$BR_t^{(s \to r^{(l+1)}),Y}(s_{t,i}^Y) = \sum_{k=0}^{2} a_{mk}^{(l+1)} \cdot (s_{t,i}^Y)^k,$$

and the new polynomial coefficients are given by $$a_{mk}^{(r)} = \alpha \cdot a_{mk}^{(l)} + (1-\alpha) \cdot a_{mk}^{(l+1)}. \quad (26)$$

In other words, the polynomial coefficients of the m-th segment in an interpolated reshaping function can be derived by a simple linear interpolation of the polynomial coefficients from the two basis functions bracketing the target value r. Given equation (26), $$BR_t^{(s \to r),Y}(s_{t,i}^Y) = \sum_{k=0}^{2} a_{mk}^{(r)} \cdot (s_{t,i}^Y)^k. \quad (27)$$

In an embodiment, chroma reshaping may be performed using a set of MMR polynomials. Let $S_{t,i}^{y,d}$ denote the i-th pixel value of the down-sampled Y component, and let $P_C$ denote the number of sample points (or pixels). Let $$\bar{s}_{t,i}^T = [1 s_{t,i}^{y,d} s_{t,i}^{c_0} s_{t,i}^{c_1} \ldots s_{t,i}^{y,d} s_{t,i}^{c_0} \ldots (s_{t,i}^{y,d} s_{t,i}^{c_0})^2 \ldots (s_{t,i}^{c_0})^2 (s_{t,i}^{c_1})^2 \ldots ]$$

denote the support of dependency vector for an MMR model. Then for $$\bar{S}_t = \begin{bmatrix} \bar{s}_{t,0}^T \\ \bar{s}_{t,1}^T \\ \vdots \\ \bar{s}_{t,P_C-1}^T \end{bmatrix}, \tag{28}$$

let the l reference reconstructed HDR chroma channels be denoted as $$r_{t,i}^{(l)} = \begin{bmatrix} r_{t,i}^{(l),c_0} \\ r_{t,i}^{(l),c_1} \end{bmatrix}. \tag{29}$$

Then, using MMR, the predicted chroma values are $$\hat{r}_{t,i}^{(l)} = \begin{bmatrix} \hat{r}_{t,i}^{(l),c_0} \\ \hat{r}_{t,i}^{(l),c_1} \end{bmatrix},$$

or, in a matrix representation, given $$R_t^{(l)} = \begin{bmatrix} (r_{t,0}^{(l)})^T \\ (r_{t,1}^{(l)})^T \\ \vdots \\ (r_{t,P_C-1}^{(l)})^T \end{bmatrix} \text{ and } \hat{R}_t^{(l)} = \begin{bmatrix} (\hat{r}_{t,0}^{(l)})^T \\ (\hat{r}_{t,1}^{(l)})^T \\ \vdots \\ (\hat{r}_{t,P_C-1}^{(l)})^T \end{bmatrix}, \tag{30}$$

the predicted values are:

$$\hat{R}_t^{(l)} = \bar{S}_t M_t^{(l)}. \tag{31}$$

Let $A_t = \bar{S}_t^T \bar{S}_t$ and $B_t^{(l)} = \bar{S}_t^T R_t^{(l)}$, then the MMR coefficients can be obtained via least squared optimization, as $$M_t^{(l)} = (A_t)^{-1} B_t^{(l)}. \tag{32}$$

After applying interpolation, $$r_{t,i}^{c_0} = \alpha \cdot r_{t,i}^{(l),c_0} + (1-\alpha) \cdot r_{t,i}^{(l+1),c_0},$$

$$r_{t,i}^{c_1} = \alpha \cdot r_{t,i}^{(l),c_1} + (1-\alpha) \cdot r_{t,i}^{(l+1),c_1}. \tag{33}$$

Then, given $$R_t = \alpha R_t^{(l)} + (1-\alpha) R_t^{(l+1)} \tag{34}$$

$$B_t = \bar{S}_t^T R_t \tag{35}$$

$$= \bar{S}_t^T (\alpha R_t^{(l)} + (1-\alpha) R_t^{(l+1)})$$

$$= \alpha \bar{S}_t^T R_t^{(l)} + (1-\alpha) \bar{S}_t^T R_t^{(l+1)},$$

and the MMR coefficients of the interpolated reshaping chroma function will be given by $$M_t = (A_t)^{-1} B_t \tag{36}$$

$$= (A_t)^{-1} (\alpha \bar{S}_t^T R_t^{(l)} + (1-\alpha) \bar{S}_t^T R_t^{(l+1)})$$

$$= \alpha (A_t)^{-1} \bar{S}_t^T R_t^{(l)} + (1-\alpha)(A_t)^{-1} \bar{S}_t^T R_t^{(l+1)}$$

$$= \alpha M_t^{(l)} + (1-\alpha) M_t^{(l+1)}.$$

In other words, the MMR coefficients of an interpolated reshaping function for a reshaping parameter r can be derived by a simple linear combination of the two sets of MMR coefficients from the two functions bracketing r, or $$BR_t^{(s \to r), C_0}( ) = \alpha \cdot BR_t^{(s \to r^{(l)}), C_0}( ) + (1-\alpha) \cdot BR_t^{(s \to r^{(l+1)}), C_0}( ),$$

$$BR_t^{(s \to r), C_1}( ) = \alpha \cdot BR_t^{(s \to r^{(l)}), C_1}( ) + (1-\alpha) \cdot BR_t^{(s \to r^{(l+1)}), C_1}( ),$$

$$c^1( ). \tag{37}$$

Asymmetric Reshaping

Given an HDR image, in traditional reshaping: a) the HDR image is remapped to a reshaped image, b) the reshaped image is transmitted, and c) on the decoder, the decoder applies a backward reshaping function to reconstruct a close approximation of the original HDR image. This can be referred to as "symmetric reshaping," because the input color and bit-depth domain is the same as the output color and bit-depth domain. This case may not be applicable to certain applications, such as mobile picture capture and communications.

For example, in embodiment, the following operations may be present:

A camera captures raw HDR data

Figure 3A:
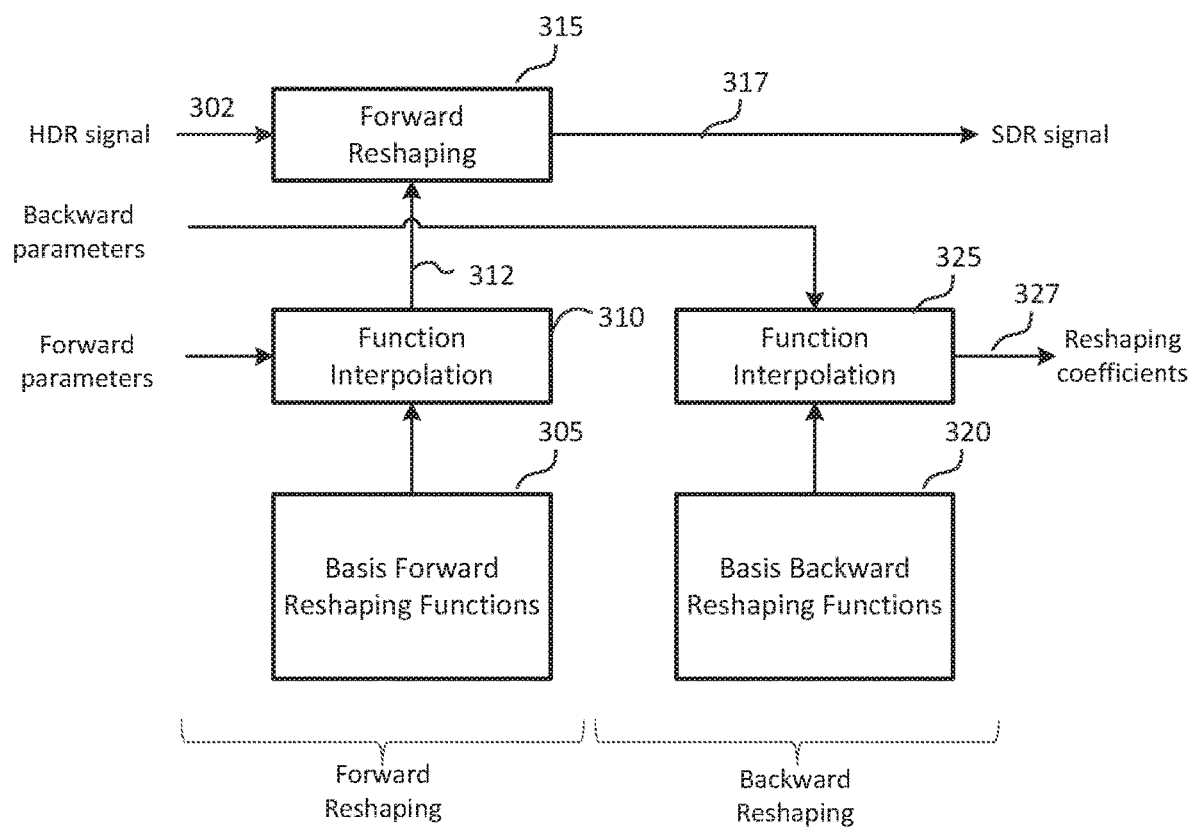
FIG. 3A depicts an example process for asymmetric reshaping in an encoder according to an embodiment of this invention.

A first mapping function translates the raw HDR data to color-graded HDR data by applying a variety of algorithms, such as demosaicing, color space conversion, inverse EOTF mapping, and the like. This mapping function may change depending on capturing parameters, target display parameters, and other variables A second mapping function may reshape the color-graded HDR data to generate SDR data Because of the large number of open variables, computing two mapping functions is very computationally intensive, especially for a mobile environment. In an embodiment, it is desired to combine all mappings into one, thus generating SDR data directly from the raw HDR data. However, in a playback device, it is desired to reconstruct color-graded HDR data and not the raw HDR data. Such reshaping may be referred to as "asymmetric reshaping," since there is a mismatch between the source and output domains. FIG. 3A depicts an example of asymmetric reshaping in an encoder according to an embodiment based on semi-adaptive reshaping discussed earlier.

As depicted in FIG. 3A, the forward reshaping stage may include: a set of basis forward reshaping functions (305), a function interpolation unit (310), which can generate a new forward reshaping function (312) by interpolating from two basis forward reshaping functions, and a forward reshaping unit (315) which will apply the generated forward function (312) to generate the reshaped signal (317), e.g., an SDR signal.

Given the forward reshaping function (312), under symmetric reshaping (e.g., as shown in FIG. 1), an encoder could generate the parameters of the reverse or backward reshaping function (e.g., 150) (e.g., see Ref. [5]), which could be transmitted to the decoder as was shown in FIG. 1. Alternatively, as shown in FIG. 3A, the encoder may include a separate backward reshaping stage which may include: a set of basis backward reshaping functions (320), and a second function interpolation unit (325), which can generate a new backward reshaping function (327) by interpolating from two basis backward reshaping functions. The parameters of the backward reshaping function may be communicated as metadata. The forward and backward parameters for function interpolation may include such variables as: exposure time, ISO, maximum luminance, and the like. The input HDR signal (302) may be raw HDR data or color-graded HDR data.

As mentioned earlier, one of the applications of embodiments of this invention is video encoding for mobile systems to simplify the computation requirements. In such a scenario, the forward path handles the camera raw to SDR mapping, and the backward path handles the SDR to HDR mapping. The parameters to both paths can incorporate a variety of camera parameters, such as exposure time, ISO, and the like.

Decoder Considerations

Decoding embodiments may also incorporate semi-adaptive reshaping as follows: For example, in an embodiment, as shown in FIG. 3A, an encoder may transmit directly to a decoder the metadata defining explicitly the parameters of the interpolated backward reshaping function (327). Then, decoding follows the decoding process depicted in FIG. 1B.

Figure 3B:
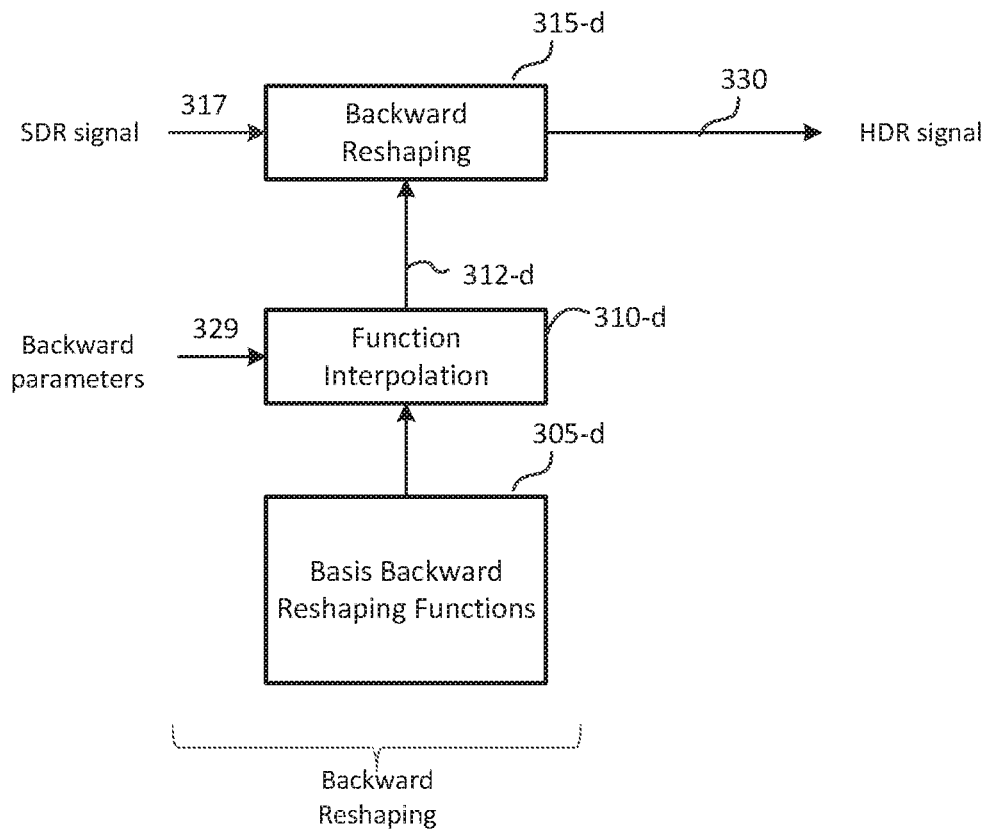
FIG. 3B depicts an example process for the interpolation of reshaping functions in a decoder according to an embodiment of this invention.

In another embodiment, to reduce the amount of metadata being communicated, as depicted in FIG. 3B, function interpolation may also be performed at the decoder site. For example, at the sequence level, an encoder may communicate to a decoder: the number of basis backward reshaping functions and the reshaping parameters (for luma and chroma) for each such function, plus an identification "tag" (or reshaping-index parameter) for each basis function. This allows the decoder to build a database of basis backward-reshaping functions (305-$d$). Then, at the scene or frame level, the encoder may simply send the data (329) required for the decoder to generate the interpolated reshaping function, which may include: the identification tags of the bracketing reshaping functions and the interpolation factor ($\alpha$), or just the target reshaping parameter required by the decoder to generate this information on its own. Given these data, the decoder uses a function-interpolation block (310-$d$) to generate the appropriate backward reshaping function (312-$d$), which can be used in the backward-reshaping block (315-$d$) to generate the reshaped HDR signal (330).

REFERENCES

Each of these references is incorporated by reference in its entirety.
1. G-M, Su et al., "Encoding and decoding reversible, production-quality single-layer video signals," WO 2017/165494.
2. Q. Song et al., "High-fidelity full-reference and high-efficiency reduced reference encoding in end-to-end single-layer backward compatible encoding pipeline," U.S. Provisional Patent Application No. 62/720,375, filed on Aug. 21, 2018.
3. B. Wen et al., "Inverse luma/chroma mappings with histogram transfer and approximation," U.S. Patent Application Publication, US 2018/0098094.
4. G-M. Su et al., "Multiple color channel multiple regression predictor," U.S. Pat. No. 8,811,490.
5. A. Kheradmand et al., "Block-based content-adaptive reshaping for high-dynamic range," U.S. Pat. No. 10,032,262.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to the interpolation of reshaping functions, such as those described herein. The computer and/or IC may compute, any of a variety of parameters or values that relate to the interpolation of reshaping functions as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for the interpolation of reshaping functions as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the interpolation of reshaping functions for HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present disclosure may be appreciated from the following enumerated example embodiments (EEEs):

EEE1. In an apparatus comprising one or more processors, a method for generating a reshaping function, the method comprising:

accessing a first set of basis reshaping functions, wherein a basis reshaping function maps pixel codewords from a first codeword representation to a second codeword representation and each reshaping function is characterized by a reshaping-index parameter;

receiving an input image in the first codeword representation and an input reshaping parameter;

identifying within the first set of basis reshaping functions a first basis reshaping function with a first reshaping-index parameter lower than the input reshaping parameter and a second basis reshaping function with a second reshaping-index parameter higher than the input reshaping parameter;

generating an output forward reshaping function based on the first basis reshaping function and the second basis reshaping function;

applying the output forward reshaping function to the input image to generate a reshaped image in the second codeword representation; and coding the reshaped image to generate a coded reshaped image.

EEE2. The method of EEE1, further comprising:

generating a backward reshaping function based on the output forward reshaping function; and communicating to a decoder the coded reshaped image and the backward reshaping function.

EEE3. The method of EEE 1 or EEE 2, further comprising:

accessing a second set of basis reshaping functions, wherein a basis reshaping function maps pixel codewords from the second codeword representation to a third codeword representation;

receiving a second input reshaping parameter;

identifying within the second set of basis reshaping functions a third basis reshaping function with a third reshaping-index parameter lower than the second input reshaping parameter and a fourth basis reshaping function with a fourth reshaping-index parameter higher than the second input reshaping parameter;

generating an output backward reshaping function based on the third basis reshaping function and the fourth basis reshaping function in the second set of basis reshaping functions; and communicating to a decoder the coded reshaped image and the output backward reshaping function.

EEE4. The method of any of EEEs 1-3, wherein generating the output forward reshaping function comprises:

computing an interpolating factor based on the input reshaping parameter, the first reshaping-index parameter, and the second reshaping-index parameter; and generating parameters of the output forward reshaping function by a linear interpolation between corresponding parameters of the first basis reshaping function and the second basis reshaping function.

EEE5. The method of EEE 4, when computing the interpolating factor comprises computing:

$$\alpha = \frac{r^{(l+1)} - r}{r^{(l+1)} - r^{(l)}},$$

wherein $\alpha$ denotes the interpolating factor, r denotes the input reshaping parameter, $r^{(l)}$ denotes the first reshaping-index parameter, $r^{(l+1)}$ denotes the second reshaping-index parameter, and $r^{(l)} < r < r^{(l+1)}$.

EEE6. The method of EEE 4 or EEE 5, wherein generating parameters for the output forward reshaping shaping function comprises computing:

$$a_{mk}^{(r)} = \alpha \cdot a_{mk}^{(l)} + (1-\alpha) \cdot a_{mk}^{(l+1)}, \text{ for } m=1,2, \ldots K, \text{ for } k=0,1,2, \ldots, N,$$

wherein for a forward reshaping function represented using K polynomial segments, where each polynomial segment is represented by an N-th order polynomial, $\alpha$ denotes the interpolation factor, and $a_{mk}^{(r)}$, $a_{mk}^{(l)}$, and $a_{mk}^{(l+1)}$ denote respectively the polynomial coefficients for the m-th segment in the output forward reshaping function, the first basis reshaping function, and the second basis reshaping function.

EEE7. The method of any of EEEs 4-6, wherein generating parameters for the output reshaping shaping function comprises computing:

$$M_t^{(r)} = \alpha M_t^{(l)} + (1-\alpha) M_t^{(l+1)},$$

wherein $\alpha$ denotes the interpolation factor, and $M_t^{(r)}$, $M_t^{(l)}$, and $M_t^{(l+1)}$ denote respectively sets of multivariate, multiple-regression coefficients for the output reshaping function, the first basis reshaping function, and the second basis reshaping function.

EEE8. The method of any of EEEs 1-7, wherein generating the first set of basis reshaping functions comprises:

accessing a database of image pairs representing the same scene in a first signal representation form and a second signal representation form, wherein the first signal representation form is different than the second signal representation form;

generating based on the database of image pairs an output set of reshaping functions larger than the first set of basis reshaping functions; and selecting the first set of basis reshaping functions among the output set of reshaping functions such that an error between interpolated reshaped functions using the first set of basis reshaping functions and functions in the first set of basis reshaping functions is within a threshold.

EEE9. The method of EEE 8 wherein the first signal representation form comprises a high-dynamic range representation and the second signal representation form comprises a standard dynamic range representation.

EEE10. The method of any of EEEs 1-9, wherein two or more functions in the first set of basis reshaping functions are represented as multi-segment polynomials and corresponding segments for these two or more functions have same starting and ending pivot points.

EEE11. In an apparatus comprising one or more processors, a method to decode a coded image, the method comprising:

receiving a coded reshaped image in a first codeword representation and an input reshaping parameter;

decoding the coded reshaped image to generate a first decoded image in the first codeword representation;

accessing a set of basis reshaping functions, wherein a reshaping function maps pixel codewords from the first codeword representation to a second codeword representation and each reshaping function is characterized by a reshaping-index parameter;

identifying within the set of basis reshaping functions a first basis reshaping function with a first reshaping-index parameter lower than the input reshaping parameter and a second basis reshaping function with a second reshaping-index parameter higher than the input reshaping parameter;

generating an output reshaping function based on the first basis reshaping function and the second basis reshaping function; and applying the output reshaping function to the first decoded image to generate an output image in the second codeword representation.

EEE12. The method of EEE 11, wherein generating the output reshaping function comprises:

computing an interpolating factor based on the input reshaping parameter, the first reshaping-index parameter, and the second reshaping-index parameter; and generating parameters of the output reshaping function by a linear interpolation between corresponding parameters of the first basis reshaping function and the second basis reshaping function.

EEE13. The method of EEE 12, when computing the interpolating factor comprises computing:

$$\alpha = \frac{r^{(l+1)} - r}{r^{(l+1)} - r^{(l)}},$$

wherein $\alpha$ denotes the interpolation factor, r denotes the input reshaping parameter, $r^{(l)}$ denotes the first reshaping-index parameter, $r^{(l+1)}$ denotes the second reshaping-index parameter, and $r^{(l)} < r < r^{(l+1)}$.

EEE14. A non-transitory computer-readable storage medium having stored thereon computer-executable instructions for executing with one or more processors a method in accordance with any of the EEEs 1-13.

EEE15. An apparatus comprising a processor and configured to perform any of the methods recited in EEEs 1-13.

What is claimed is:

1. A method for generating in a computer apparatus a reshaping function for reshaping an input image in a first codewords representation to a reshaped image in a second codewords representation, the method comprising:

accessing a first set of pre-computed reshaping functions, wherein a pre-computed reshaping function of the first set maps pixel codewords from the first codeword representation to the second codeword representation and each reshaping function is identified by a value of a parameter, wherein the value of the parameter corresponds to a device setting of a device for capturing or displaying the input image or the reshaped image;

receiving an input image in the first codeword representation and a parameter identifying the reshaping function to be generated, wherein the first set of pre-computed reshaping functions does not comprise the reshaping function to be generated;

identifying within the first set of pre-computed reshaping functions a first pre-computed reshaping function identified by a first parameter having a first value lower than a value of the received parameter and a second pre-computed reshaping function identified by a second parameter having a second value higher than the value of the received parameter, the value of the received parameter being different from any values of the parameters identifying the pre-computed reshaping functions of the first set;

generating the reshaping function by interpolating the first pre-computed reshaping function and the second pre-computed reshaping function based on an interpolation factor computed using the received parameter, the first parameter, and the second parameter;

applying the generated reshaping function to the input image to generate the reshaped image in the second codeword representation; and coding the reshaped image to generate a coded reshaped image.

2. The method of claim 1, wherein the device is a mobile device.

3. The method of claim 1, wherein the device setting comprises one of: a luminance, a maximum luminance, an exposure time, an ISO number, a picture mode, or a flash mode of the device.

4. The method of claim 1, wherein the generated reshaped function is a forward reshaping function and the method further comprises:

generating a backward reshaping function based on the forward reshaping function; and communicating to a decoder the coded reshaped image and the backward reshaping function.

5. The method of claim 1, further comprising:

accessing a second set of pre-computed reshaping functions, wherein a pre-computed reshaping function maps pixel codewords from the second codeword representation to a third codeword representation;

receiving a further received parameter having a further value different from any values of the parameters identifying the reshaping functions of the second set;

identifying within the second set of pre-computed reshaping functions a third pre-computed reshaping function identified by a third parameter having a third value lower than the further value of the further received parameter and a fourth pre-computed reshaping function identified by a fourth parameter having a fourth value higher than the further value;

generating an output backward reshaping function by interpolating the third pre-computed reshaping function and the fourth pre-computed reshaping function in the second set of pre-computed reshaping functions using the further received parameter; and communicating to a decoder the coded reshaped image and the output backward reshaping function.

6. The method of claim 1, wherein generating the reshaping function comprises:

computing an interpolating factor between zero and one, based on the received parameter, the first parameter, and the second parameter; and generating parameters of the output reshaping function by interpolation between corresponding parameters of the first pre-computed reshaping function and the second pre-computed reshaping function, wherein the interpolation uses the interpolation factor.

7. The method of claim 6, wherein computing the interpolating factor comprises computing:

$$\alpha = \frac{r^{(l+1)} - r}{r^{(l+1)} - r^{(l)}},$$

wherein $\alpha$ denotes the interpolating factor, r denotes the received parameter, $r^{(l)}$ denotes the first parameter, $r^{(l+1)}$ denotes the second parameter, and $r^{(l)} < r < r^{(l+1)}$.

8. The method of claim 6, wherein generating parameters for the output reshaping shaping function comprises computing:

$$a_{mk}^{(r)} = \alpha \cdot a_{mk}^{(l)} + (1-\alpha) \cdot a_{mk}^{(l+1)}, \text{ for } m=1,2,\ldots K, \text{ for } k=0,1,2,\ldots,N,$$

wherein for a forward reshaping function represented using K polynomial segments, where each polynomial segment is represented by an N-th order polynomial, $\alpha$ denotes the interpolation factor, and $a_{mk}^{(r)}$, $a_{mk}^{(l)}$, and $a_{mk}^{(l+1)}$ denote respectively the polynomial coefficients for the m-th segment in the output forward reshaping function, the first pre-computed reshaping function, and the second pre-computed reshaping function.

9. The method of claim 6, wherein generating parameters for the output reshaping shaping function comprises computing:

$$M_t^{(r)} = \alpha M_t^{(l)} + (1-\alpha) M_t^{(l+1)},$$

wherein $\alpha$ denotes the interpolation factor, and $M_t^{(r)}$, $M_t^{(l)}$, and $M_t^{(l+1)}$ denote respectively sets of multivariate, multiple-regression coefficients for the output reshaping function, the first pre-computed reshaping function, and the second pre-computed reshaping function.

10. The method of claim 1, wherein the reshaping functions of the first set are pre-computed by:
    accessing a database of image pairs representing the same scene in a first signal representation format and a second signal representation format, wherein the first signal representation format is different from the second signal representation format;
    generating based on the database of image pairs an output set of reshaping functions larger than the first set of reshaping functions;
    interpolating all the reshaping functions in the output set; and
    selecting the first set of reshaping functions among the output set of reshaping functions such that an error between interpolated reshaped functions and functions in the first set of reshaping functions is within a threshold.

11. The method of claim 10 wherein the first signal representation format comprises a high-dynamic range representation and the second signal representation format comprises a standard dynamic range representation.

12. The method of claim 10, wherein the first signal representation format and the second signal representation format comprise one or more of: an Electric-optical Transfer function (EOTF), a bit-depth, a color gamut, a color format, or a color space.

13. The method of claim 1, wherein two or more functions in the first set of pre-computed reshaping functions are represented as multi-segment polynomials and corresponding segments for these two or more functions have same starting and ending pivot points.

14. A method to decode a coded image, the method comprising:
    receiving a coded reshaped image in a first codeword representation and a received parameter;
    decoding the coded reshaped image to generate a first decoded image in the first codeword representation;
    accessing a set of pre-computed reshaping functions, wherein a reshaping function maps pixel codewords from the first codeword representation to a second codeword representation and each reshaping function is identified by a value of a parameter identifying the reshaping function, wherein the value of the parameter comprises a device setting of a device for capturing or displaying the input image or the reshaped image;
    identifying within the set of pre-computed reshaping functions a first pre-computed reshaping function identified by a first parameter having a first value lower than a value of the received parameter and a second pre-computed reshaping function identified by a second parameter having a second value higher than the value of the received parameter, the value of the received parameter being different from any values of the parameters identifying the pre-computed reshaping functions of the first set;
    generating an output reshaping function by interpolating the first pre-computed reshaping function and the second pre-computed reshaping function using the received parameter, wherein the accessed set of pre-computed reshaping functions does not comprise the output reshaping function; and
    applying the output reshaping function to the first decoded image to generate an output image in the second codeword representation.

15. The method of claim 14, wherein generating the output reshaping function comprises:
    computing an interpolating factor between zero and one based on the received parameter, the first parameter, and the second parameter; and
    generating parameters of the output reshaping function by interpolation between corresponding parameters of the first pre-computed reshaping function and the second pre-computed reshaping function, wherein the interpolation uses the interpolation factor.

16. The method of claim 15, when computing the interpolating factor comprises computing:

$$\alpha = \frac{r^{(l+1)} - r}{r^{(l+1)} - r^{(l)}},$$

wherein $\alpha$ denotes the interpolation factor, r denotes the received parameter, $r^{(l)}$ denotes the first parameter, $r^{(l+1)}$ denotes the second parameter, and $r^{(l)} < r < r^{(l+1)}$.

17. The method of claim 14, wherein the pre-computed reshaping functions are pre-stored in the device.

18. A non-transitory computer-readable storage medium having stored thereon computer-executable instructions for executing with one or more processors a method in accordance with claim 1.

19. An apparatus comprising a processor and configured to perform the method recited in claim 1.

* * * * *